Figure 1:
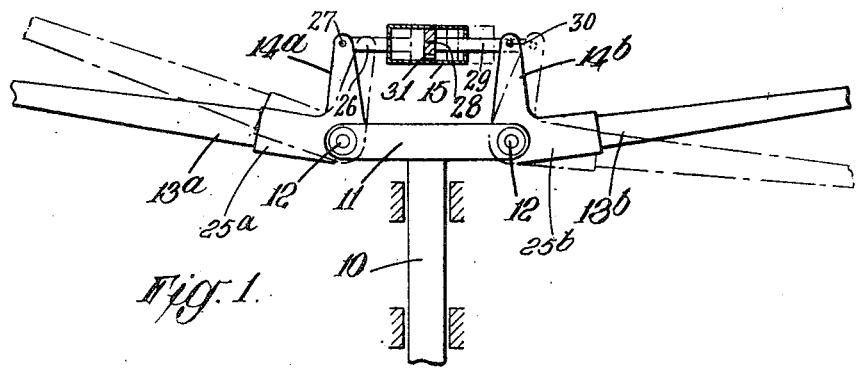

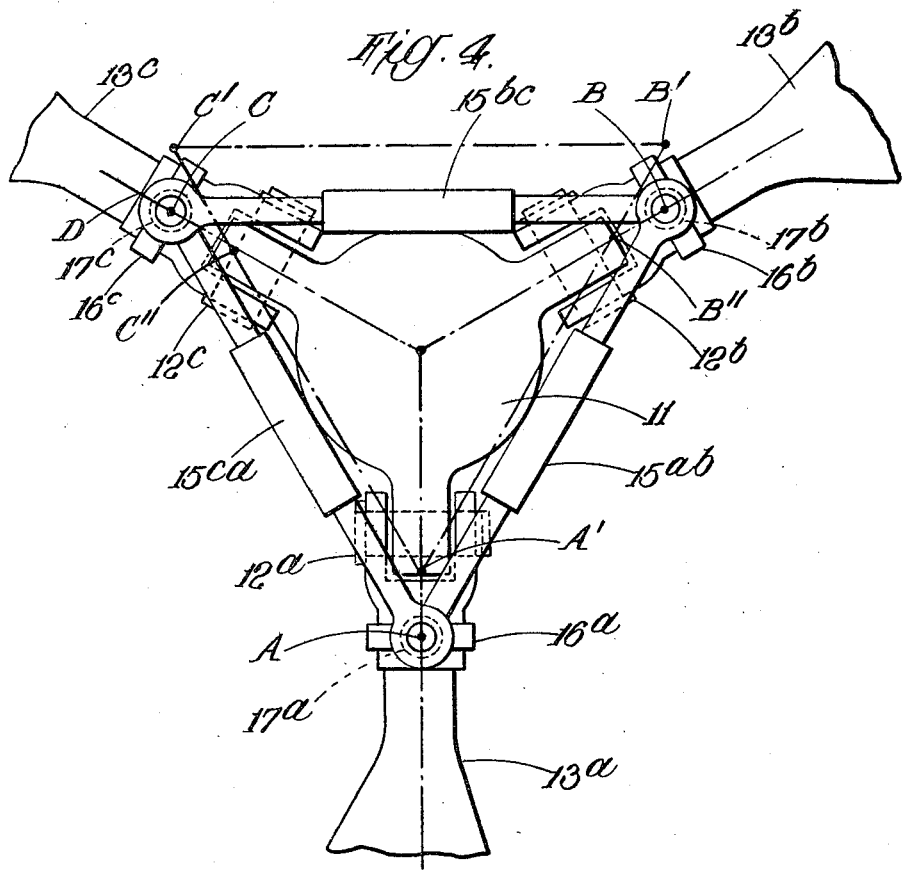
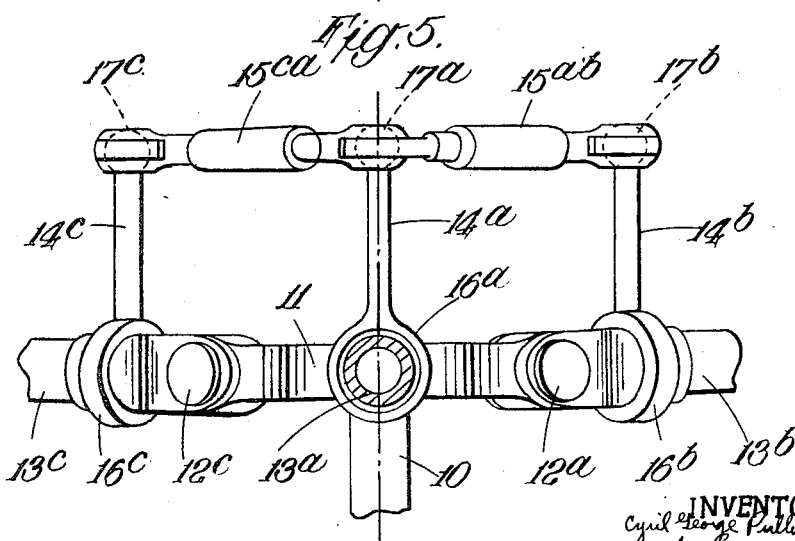

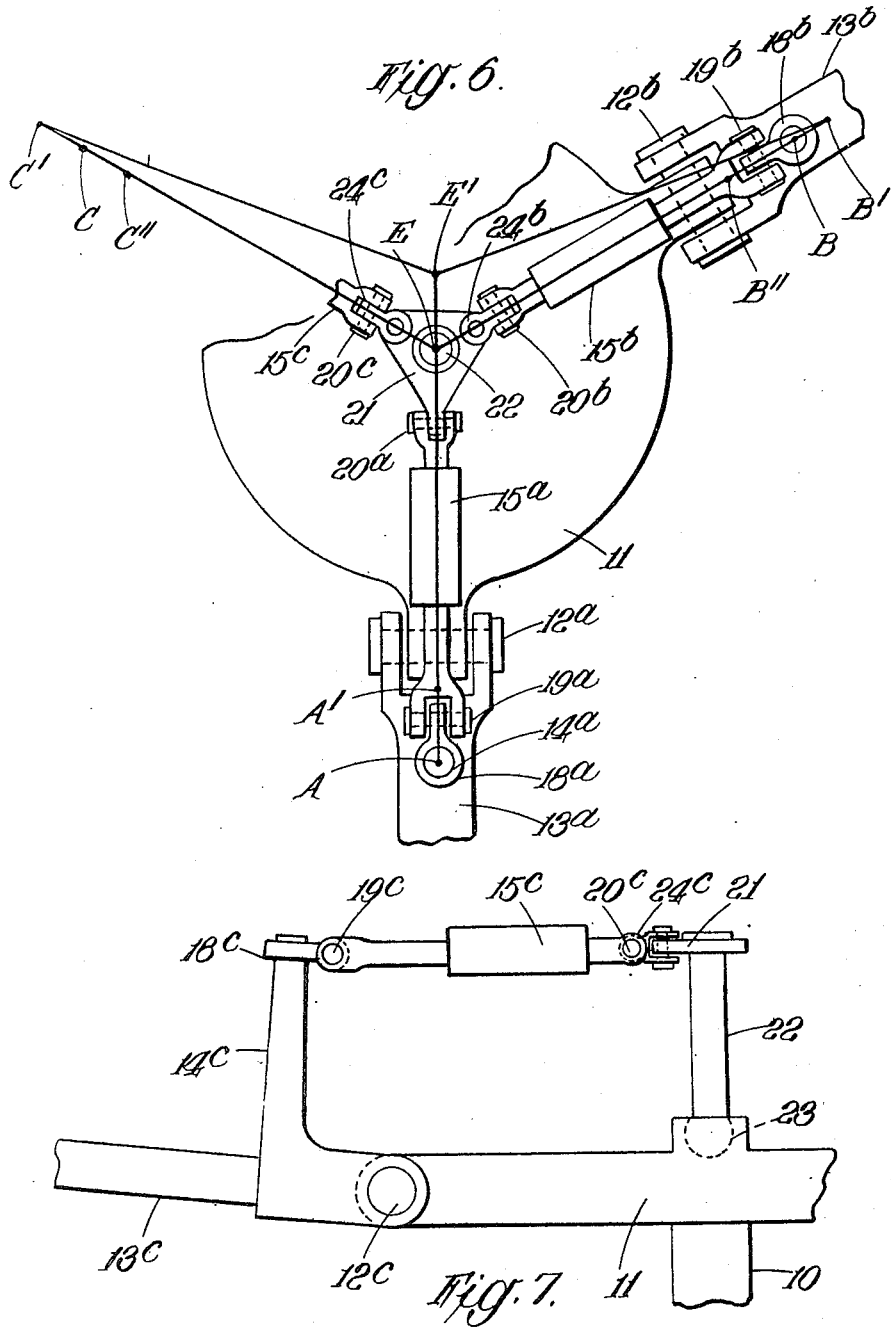

Patented Mar. 16, 1954

2,672,202

UNITED STATES PATENT OFFICE 2,672,202

AIRCRAFT SUSTAINING ROTOR BLADE DAMPING SYSTEM

Cyril George Pullin, Tadburn, Ampfield, and Jacob Samuel Shapiro, London, England, assignors, by mesne assignments, to Autogiro Company of America, Philadelphia, Pa., a corporation of Delaware Application July 3, 1947, Serial No. 758,828
In Great Britain November 15, 1945

Section 1, Public Law 690, August 8, 1946
Patent expires November 15, 1965

3 Claims. (Cl. 170—160.55)

This invention relates to aircraft having a sustaining rotor or rotors with substantially vertical axis, such as helicopters, rotaplanes, and "hybrids" between these types, in which the rotor blades are free to "flap."

The flapping blade was originally introduced to eliminate the rolling moment experienced by a rigid lifting or sustaining screw-type rotor in forward flight as a consequence of operating in a non-axial relative wind, a secondary object being the relief of bending moments in the blades; and it has hitherto been considered essential for the flapping motion to be quite unconstrained in order to prevent periodic thrust moments of the blades from reacting on the hub and setting up a rolling moment.

It can be shown that the rolling moment experienced by the aircraft is the consequence of a periodic thrust moment of each blade of simple harmonic type having a frequency of once per revolution, and that periodic components of blade thrust and thrust moment with higher harmonic frequencies do not impart a rolling moment to the aircraft but cause oscillatory forces and couples which are transmitted to the airframe and/or the controls.

For complete elimination of the rolling moment a simple harmonic flapping motion of frequency once per revolution suffices, provided it is unconstrained, but if the individual blades are completely free to execute any kind of flapping motion the actual motion executed by the blades will not be simple harmonic, but will contain components of higher harmonic frequency than the fundamental, since the aerodynamic excitation contains components of higher frequencies.

With the second and higher harmonic frequencies of flapping of each blade are associated periodic components of the reactions on the hub at the flapping hinges having similar frequencies, some but not all of which are mutually compensatory when summed over the several blades, according to the number of blades employed. Those periodic components of hinge reaction which are additive are transmitted to the airframe or/and the controls as undesirable periodic forces and couples, the latter being introduced when the flapping hinges are offset from the rotor axis (which offset is considered to be advantageous from the point of view of stability).

It can also be shown that the aerodynamic excitation of the second and higher harmonics of flapping motion includes terms proportional to the square and higher powers of the tip speed ratio $$\left(\frac{V}{\Omega R}\right)$$

where $V$=the true air speed of the aircraft along the flight path in feet per second, $\Omega$=the angular velocity of the rotor in radians per second and $R$=the blade radius in feet.[1] Therefore at high forward speed these higher harmonics of flapping are aggravated. At the moderate forward speeds hitherto attainable by helicopters, the amplitudes of the second and higher harmonic components of the flapping motion are relatively small, and consequently the oscillatory forces and couples transmitted to the airframe and controls are not serious but, at the higher forward speeds now becoming practicable, there is a marked tendency to roughness and vibration believed to be attributable to the increased amplitude of the second and higher harmonics of the flapping motion.

The foregoing discussion has been concerned with "flapping" rotors in general. It applies not only to the so-called "pure flapping" rotors, in which the pitch angles of the blades (relative to a plane perpendicular to the hub axis) remain unaltered during flapping, but also to rotors of the kind sometimes called "torsional-flapping," in which the pitch angles decrease as the blades flap upward and increase with downward flapping. In other words, the axis of the flapping pivot, instead of being perpendicular, may have some obliquity to the plane containing the longitudinal axis of the blade and the rotor axis. The term "approximately perpendicular" is herein meant to include pure flapping pivots and also somewhat oblique pivots on which the preponderance of blade swinging is in the flapping direction with relation to the general rotational path of the rotor blades. The effect of the ob-

---

[1] NACA Technical Note No. 1604 "Standard Symbols for Helicopters" defines tip speed ratio substantially as follows:

$$\mu = \text{tip speed ratio} = \left(\frac{V \cos \alpha}{\Omega R}\right)$$

where:
  $V$=true air speed of helicopter along flight path in feet per second.
  $\cos \alpha$=cosine of rotor angle of attack.
  $\Omega$=rotor angular velocity in radians per second, and
  $R$=blade radius in feet.
In flight at higher forward speeds, cosine $\alpha$ is, to a first approximation, unity, and accordingly the expression as used herein has been simplified to read $$\left(\frac{V}{\Omega R}\right)$$

liquity may be to decrease the amplitude of the fundamental component of the flapping oscillation for a given value of $$\frac{V}{\Omega R}$$

(other things being equal), but it may increase the amplitudes of one or more of the higher harmonic components of the flapping motion, the probable consequence being an aggravation of the tendency to roughness and vibration. Such a flapping rotor is shown, for example, in Cierva Patent 1,811,303. Although other effects are thereby secured, the blade pivot thereof is still primarily serving the functions of a flapping pivot, for (just as is the case with the embodiments illustrated in the drawings attached hereto) the axis of such pivot makes an angle of more than 45° relative to the longitudinal axis of the blade and also relative to an upright plane containing the rotor axis and said blade axis, so that the preponderance of the motion of the blade thereon is in a flapping direction with relation to the general rotational path.

It is our belief that the oscillatory reactions on the airframe and controls could be considerably decreased if it were possible to suppress some or all of the higher harmonic components of the flapping motion. Now in flapping motion in the fundamental frequency of once per revolution the blade tips all sweep the same path; and, with amplitudes within the limits actually encountered, this path can, to a high degree of approximation, be taken as lying in a plane inclined to the plane normal to the axis of rotation at an angle equal to the amplitude of the flapping (i. e. half the total angle through which the blades flap). A mechanism which would suppress flapping in some at least of the higher harmonic frequencies without constraining the simple harmonic flapping in the fundamental frequency could therefore be designed, but it will be evident that such a mechanism would "freeze" the coning angle of the blades at a fixed value. This would be disadvantageous as a "built-in" coning angle will only eliminate (steady) bending moment at the blade root for the design flight condition; in particular if the (fixed) coning angle is appropriate to powered flight (helicopter condition) there may be a large unrelieved steady bending moment in the blade roots in motorless descent or gliding flight (rotaplane condition), since in the latter condition the revolutions per minute of the rotor may be considerably reduced, and are necessarily so reduced in the case of the so-called torsional-flapping rotor while the thrust remains approximately constant. It is therefore desirable that the coning angle should be capable of automatically adjusting itself to the flight condition to relieve bending moments in the blades.

The problem, therefore, which awaits solution is the provision of means for restricting as much as possible the amplitudes of flapping motion in one or more of the second and higher harmonic frequencies, without imposing any constraint on the fundamental flapping oscillation of frequency once per revolution, while allowing the coning angle to adjust itself automatically to changes in the condition of flight.

This we do according to the invention by providing interblade damping means, which react from blade to blade, and not from the blades to the hub, in such a way that flapping motions of the blades that leave all the blade tips co-planar, without shifting the point at which the plane containing the blade tips intersects the hub axis, do not substantially alter the configuration of the damping system; and the damping means themselves are such that their resistance to displacement increases with the rate of displacement, being large at the displacement rates associated with flapping motions of frequency twice per revolution and of higher frequency, but small at displacement rates associated with variations of coning angle in response to changing conditions of flight. In the foregoing statement it is to be understood that the effects of blade flexure are ignored.

The dampers may be such as to introduce true damping in the dynamical meaning of the word, i. e. their resistance to displacement may be linearly proportional to the rate of displacement, or they may have a non-linear resistance/displacement rate characteristic; the only essential requirement is that for a given displacement, the shorter the time taken to effect it the greater is the energy absorbed. If desired, the dampers may be "tuned" (or "tunable") to give critical damping at a selected harmonic frequency.

The dampers may be connected in several ways, the appropriateness of any particular system depending on the blade configuration; for instance with an even number of blades the dampers may be connected between pairs of opposite blades. For odd or even numbers of blades the dampers may be connected from blade to blade in a ring, suitable connections being provided from each blade to its associated dampers to ensure that periodic changes of pitch angle (relative to the plane containing the blade tips when the latter remain co-planar) do not effect the configuration of the damping system. Again, the dampers may be connected in the manner of a star from each blade to a neutral point located in the axial direction by a link universally jointed to the hub.

Figure 2:
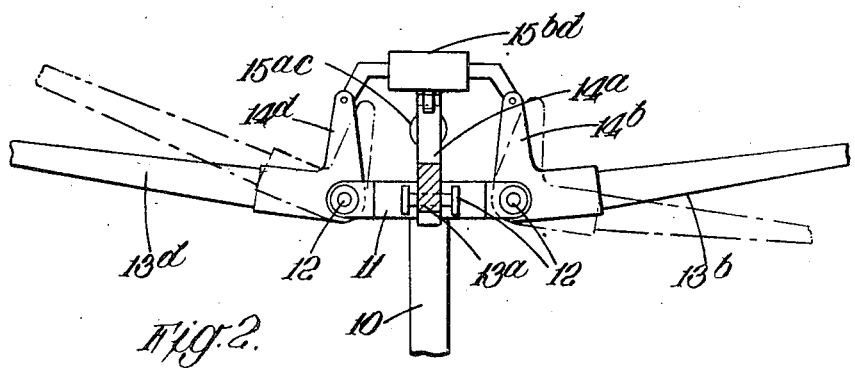
Figure 3:
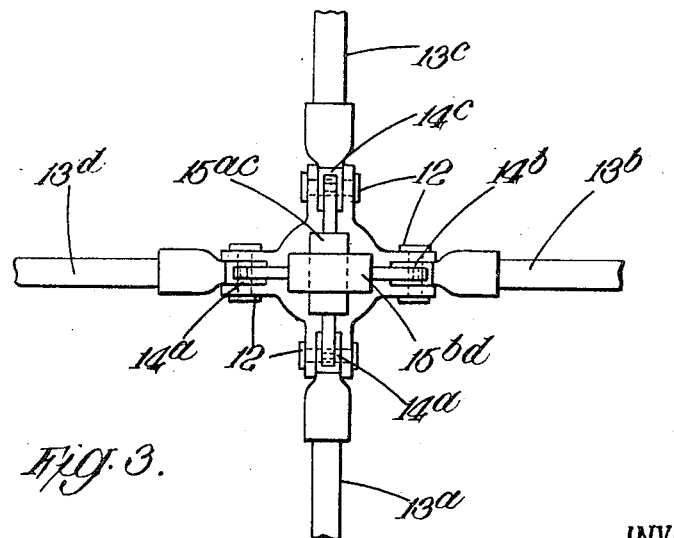

The nature of the invention and how it may be performed will be better understood from a consideration of some specific examples of flapping damping systems in accordance with the invention as illustrated schematically in the accompanying drawings comprising:

Fig. 1, which shows a two-bladed rotor in elevation;

Figs. 2 and 3, showing a four-bladed rotor in elevation and plan respectively;

Figs. 4 and 5, showing a three-bladed rotor in plan and elevation respectively;

Figs. 6 and 7, showing a three-bladed rotor, in plan and partial elevation respectively, with a different damper arrangement.

In the two-bladed rotor arrangement of Fig. 1, the driving shaft and hub are conveniently indicated at 10 and 11 respectively. The hub is provided with flapping hinges 12 on which blade root stub members 25a, 25b are respectively articulated. The blade root stub members are provided with integral rigid upright arms 14a and 14b respectively, the upper ends of which are linked together by a damper element 15, preferably of the hydraulic type. The outwardly extending parts of the blade root stub members 25a and 25b constitute sleeves which receive the blades 13a, 13b, and contain bearings (not shown) in which the blades are rotatably supported for feathering or variation of pitch angle.

As shown, the body of damper 15 is integral with a rod 26 pivoted at 27 to arm 14a, and consists of a cylinder, in which slides a piston 28 secured to a rod 29 which is pivoted at 30 to arm 14b. A small orifice 31 in the piston provides the damping resistance to flow of fluid from one side of the piston to the other.

In flapping motion with the fundamental frequency of once per revolution the blades and the associated damper element take up the positions shown in dotted lines, from which it will be seen that the length of the damper element 15 is not altered and consequently there is no resistance to flapping in the fundamental frequency. Flapping in the second harmonic frequency (twice per revolution) causes the upper ends of the arms 14a, 14b to approach and recede from one another alternately, thus lengthening and shortening the damper element and causing it to set up resistance to the flapping motion. With a fluid type of damper the resistance depends on the velocity, being zero at zero velocity and increasing with the velocity. The resistance may be directly proportional to the velocity but this is not essential.

A similar damping arrangement as applied to a four-bladed rotor is shown in Figs. 2 and 3. As before, the hub 11 driven by shaft 10 is provided with flapping hinges 12 on which are articulated the four blades 13a, 13b, 13c and 13d. The blade root stub members are each provided with a rigid upstanding arm 14a, 14b, 14c, and 14d which arms are independently linked in pairs by damping elements 15ac and 15bd. These damping elements are cranked as shown to clear one another. The positions taken up by the blades and dampers in flapping motion with the fundamental frequency of once per revolution are indicated in dotted lines, and, as before, it will be seen that in this type of motion the dampers are inoperative, being merely shifted bodily to and fro. As with the two-bladed arrangement, flapping in the second harmonic frequency brings the dampers into action.

Figs. 4 and 5 show a three-bladed rotor with a "ring" arrangement of dampers. The hub 11 driven by shaft 10 carries flapping hinges 12a, 12b, 12c on which the three blades 13a, 13b, 13c are articulated. The blades carry upright arms 14a, 14b, and 14c linked together in pairs by dampers 15ab, 15bc and 15ca. In the three-bladed arrangement, however, the arms 14a, 14b, 14c are not rigid with the blades (or with their blade root stub members) but are formed on rings 16a, 16b, 16c which are carried on bearings enabling them to rotate about the shanks of the blades, suitable thrust collars or the like being provided to prevent the rings 16a etc., from shifting axially along the blade shanks. Further, the upper ends of the arms 14a, etc., are connected to the dampers by ball joints 17a, 17b, 17c.

Referring to Fig. 4, the configuration of the damping system when there is no flapping is defined by the triangle A, B, C. In flapping motion with the fundamental frequency of once per revolution the damping system takes up a position defined by the chain-dotted triangle A', B', C' in which the whole damping system has been shifted bodily without change of configuration so that there is no resistance to flapping in the fundamental frequency. In flapping in the third harmonic frequency (three times per revolution) the damping system has a configuration typically defined by the chain-dotted triangle A'', B'', C'' in which all the dampers are equally shortened, (or in the opposite phase of the oscillation) equally lengthened, so that motion in the third harmonic frequency is resisted by the dampers, the resistance imposed being a function of the angular velocity of the flapping motion.

It will be seen that when the damping system passes from the position defined by A, B, C to that defined by A', B', C' the upper ends of the arms 14b and 14c move from B to B' and C to C' respectively, and this movement is accommodated by the pivoted connection between the arms 14a etc., and the blades 13a etc., provided by the bearing rings 16a etc. Thus, the displacement of the ball joint 17c from the point C to the point C' is compounded of a displacement from C to D effected by the flapping of blade 13c and a displacement from D to C' accommodated by rotation of the bearing ring 16c about the shank of blade 13c which enables the arm 14c to rock about the axis of the blade.

An alternative damping arrangement for a three-bladed rotor is shown in Figs. 6 and 7. As in Figs. 4 and 5, the three blades 13a, 13b, 13c are articulated on flapping hinges 12a, 12b, 12c carried by the hub 11 which is driven by shaft 10; but in this instance the upright arms 14a, 14b, 14c are rigid with the blade root stub members and are respectively connected to dampers 15a, 15b, 15c whose inner ends are all connected to a central plate 21, so that the damping system has the configuration of a "star." In order to provide the necessary degree of freedom in the end attachments of the dampers 15a, 15b, 15c the outer ends of the latter are connected by means of pivot joints 19a, 19b, 19c, having horizontal axes, with swivel links 18a, 18b, 18c which articulate on vertical axes with the ends of the arms 14a, 14b, 14c, and the inner ends of the dampers 15a, 15b, 15c are provided with similar pivot joints 20a, 20b, 20c with horizontal axes. The pivot joint 20a of damper 15a articulates directly onto the plate 21, while the pivot joints 20b and 20c connect the dampers 15b, 15c respectively with the plate 21 by means of intermediate links 24b and 24c articulated to the plate 21 on vertical pivots, the construction being therefore analogous to the master connecting rod and wrist pin arrangement used in radial piston engines.

The neutral point of the damping system, defined by the plate 21, is constrained against vertical movement by a vertical link 22 which is fixed to the plate 21 and has its lower end connected to the centre of the hub 11 by a ball joint 23.

The configuration of the damping system when there is no flapping is defined by the three points A, B and C and the neutral point E. When the blades flap with the fundamental frequency of once per revolution the damping system takes up a configuration represented by points A', B', C', E' in which the lengths of the dampers viz. A'E, B'E, and C'E, are unaltered from their lengths AE, BE and CE when there is no flapping so that in flapping motion in the fundamental frequency the damping system is inoperative. In flapping motion in the third harmonic frequency of three times per revolution the configuration of the damping system is typically defined by the points A', B'', C'', E, the central plate 21 and the link 22 undergo no displacement and the lengths of all the dampers are decreased (or in the opposite phase of the oscillation, increased) equally, so that the damping system imposes a restraint on flapping in the third harmonic frequency in the same way as in the example of Figs. 4 and 5.

In the foregoing examples, the construction of the dampers themselves is not illustrated or described as satisfactory hydraulic dampers having the required damping characteristics are known, per se.

We declare that what we claim is:

1. In an aircraft, a sustaining rotor comprising a rotational axis structure adapted to be disposed with its axis in a substantially vertical position for flight of the aircraft on said rotor, a plurality of sustaining blades radiating from said axis, a pivotal connection between each blade and said axis structure having a flapping pivot axis disposed substantially perpendicularly to an upright plane containing the rotor axis and the longitudinal blade axis, the rotor blades being free for opposite flapping on said pivot axes, but normally damped as to simultaneous upward or downward change of coning angle by means of a coning damper assembly, said assembly comprising movably-interengaged but relatively-damped parts which respectively have coning-thrust linkages connected only between blades of the rotor, so that said parts may move as a unit, free of damping-thrust reaction relative to the rotor axis structure.

2. A construction in accordance with claim 1, wherein the said coning damper assembly includes means for damping relative movements of said parts characterized in that increased resistance to such movements occurs with increased speed thereof.

3. A construction in accordance with claim 1, wherein the said coning damper assembly includes a damper for damping relative movements of said blades, said damper having the characteristic of increased resistance to such movements with increased speed thereof.

CYRIL GEORGE PULLIN.
JACOB SAMUEL SHAPIRO.

References Cited in the file of this patent

UNITED STATES PATENTS

| Number | Name | Date |
|---|---|---|
| 1,682,893 | Cierva | Sept. 4, 1928 |
| 1,884,905 | Stanley | Oct. 25, 1932 |
| 1,899,096 | Larsen | Feb. 28, 1933 |
| 1,905,776 | Wilford | Apr. 25, 1933 |
| 1,948,458 | Cierva | Feb. 20, 1934 |
| 2,192,492 | Bennett | Mar. 5, 1940 |
| 2,250,826 | Everts | July 29, 1941 |
| 2,318,260 | Sikorsky | May 4, 1943 |